(12) United States Patent
Egner et al.

(10) Patent No.: US 9,552,227 B2
(45) Date of Patent: *Jan. 24, 2017

(54) SYSTEM AND METHOD FOR CONTEXT-AWARE ADAPTIVE COMPUTING

(71) Applicant: Dell Products L.P., Round Rock, TX (US)

(72) Inventors: Will A. Egner, Cedar Park, TX (US); Sunil Jason Kumar, Austin, TX (US); Christopher Labrador, Austin, TX (US); Richard William Schuckle, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,173

(22) Filed: Oct. 13, 2015

(65) Prior Publication Data

US 2016/0034309 A1 Feb. 4, 2016

Related U.S. Application Data

(63) Continuation of application No. 13/864,017, filed on Apr. 16, 2013, now Pat. No. 9,164,810.

(51) Int. Cl.
 *G06F 9/50* (2006.01)
 *G06F 9/46* (2006.01)
(52) U.S. Cl.
 CPC ............. *G06F 9/5016* (2013.01); *G06F 9/461* (2013.01); *G06F 9/5094* (2013.01); *Y02B 60/142* (2013.01)

(58) Field of Classification Search
 None
 See application file for complete search history.

(56) References Cited

U.S. PATENT DOCUMENTS

| 6,192,388 | B1 * | 2/2001 | Cajolet | G06F 9/5072 718/100 |
| 7,308,578 | B2 * | 12/2007 | Keohane | G06F 21/51 713/175 |
| 2003/0084435 | A1 * | 5/2003 | Messer | G06F 9/505 717/174 |
| 2007/0265023 | A1 * | 11/2007 | Bengtsson | H04L 67/34 455/466 |
| 2008/0005679 | A1 * | 1/2008 | Rimas-Ribikauskas | G01C 21/3688 715/745 |

(Continued)

FOREIGN PATENT DOCUMENTS

GB WO2011135352 * 11/2011 ............. G06F 9/445

*Primary Examiner* — Meng An
*Assistant Examiner* — Jorge A Chu Joy-Davila
(74) *Attorney, Agent, or Firm* — Baker Botts L.L.P.

(57) ABSTRACT

The present disclosure relates to systems and methods for context-aware adaptive computing. In one embodiment, the present disclosure includes a method comprising receiving a request at a first information handling system (IHS) to perform an application computation. The method also includes determining a user's context, the user operating the first IHS, and ascertaining a battery state of the first IHS. The method further includes allocating the application computation between the first IHS and a second IHS based at least on the user's context and the battery state of the first IHS. The present disclosure also includes associated systems and apparatuses.

17 Claims, 3 Drawing Sheets

(56) References Cited

U.S. PATENT DOCUMENTS

| | | | |
|---|---|---|---|
| 2008/0080411 A1* | 4/2008 | Cole | H04W 48/16 370/328 |
| 2010/0180209 A1* | 7/2010 | Yang | G06F 1/266 715/748 |
| 2011/0045816 A1* | 2/2011 | Wang | G06F 3/038 455/420 |
| 2012/0173897 A1* | 7/2012 | Karkaria | G06F 9/445 713/300 |
| 2012/0254965 A1* | 10/2012 | Parker | H04L 63/0838 726/7 |
| 2012/0281711 A1* | 11/2012 | Karaoguz | H04L 45/00 370/419 |

* cited by examiner

SYSTEM AND METHOD FOR CONTEXT-AWARE ADAPTIVE COMPUTING

CROSS REFERENCE TO RELATED APPLICATIONS

This application is a continuation application of U.S. patent application Ser. No. 13/864,017 filed Apr. 16, 2013, now U.S. Pat. No. 9,164,810 issued Oct. 1, 2015, the contents of which are hereby incorporated by reference in its entirety.

TECHNICAL FIELD

The present disclosure relates generally to information handling systems, and more particularly to systems and methods for context-aware adaptive computing.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the mobility of information handling systems increases, the need to address considerations associated with mobility also increases.

SUMMARY

In one embodiment, the present disclosure includes a method comprising receiving a request at a first information handling system (IHS) to perform an application computation. The method also includes determining the user's context, the user operating the first IHS, and ascertaining a battery state of the first IHS. The method further includes allocating the application computation between the first IHS and a second IHS based at least on the user's context and the battery state of the first IHS.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Figure 1:
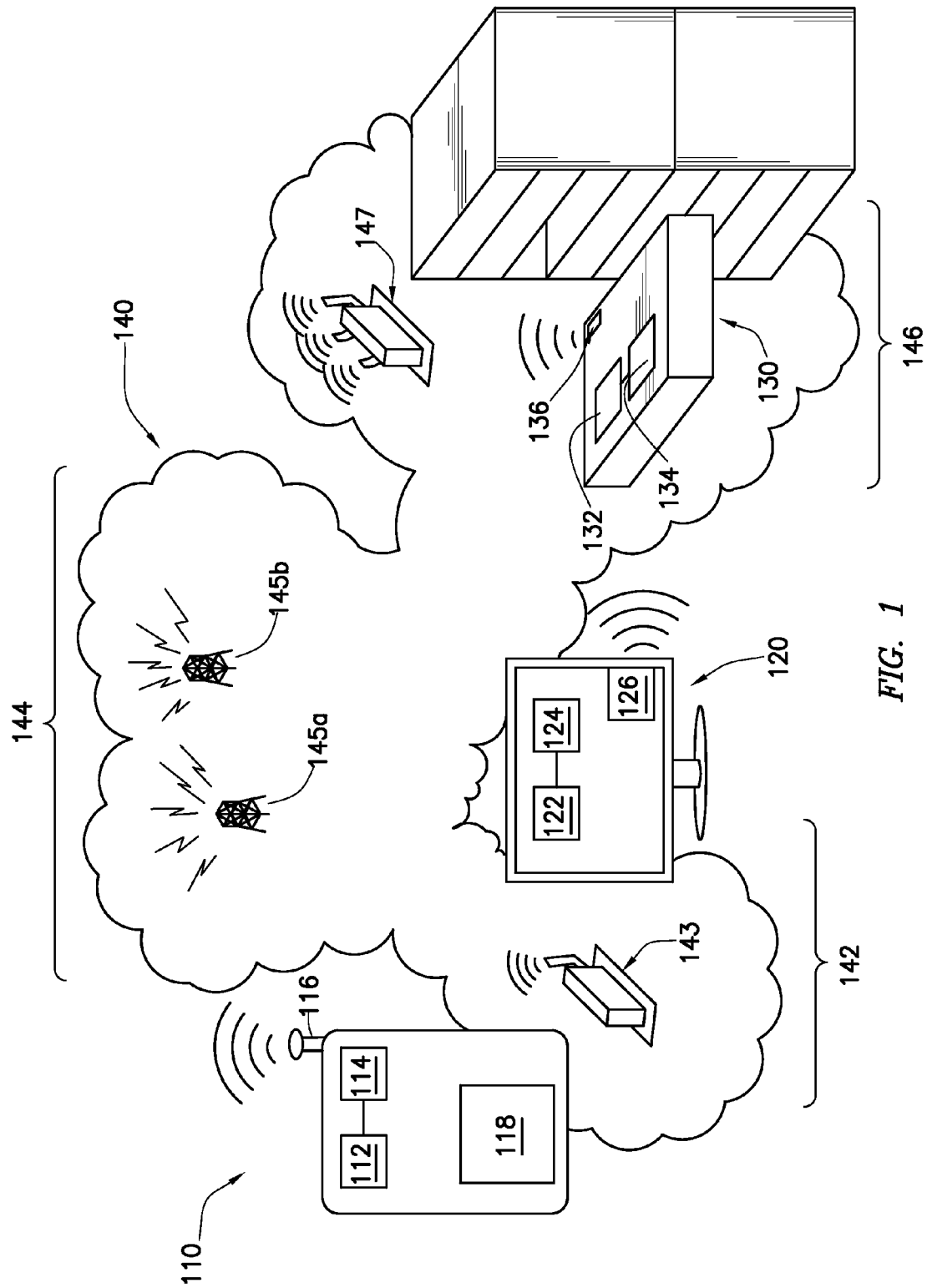
FIG. 1 illustrates an example of a variety of information handling systems with a variety of connections, in accordance with the present disclosure.

The present disclosure may relate to systems and methods for context-aware adaptive computing. For example, a user at a local information handling system may be request some application computation be performed. However, in some situations it may be beneficial to shift that computation burden to a remote information handling system rather than performing it at the local information handling system, for example, when the battery of the local information handling system is low. The local information handling system may perform an analysis to determine where, from a variety of options, the optimal location is to perform the application computation. For example and in no way limiting, the analysis may consider the battery state of the local information handling system and the context in which the user is using the information handling system and/or the application.

For the purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components or the information handling system may include one or more disk drives, one or more network ports for communicating with external devices as well as various input and output (I/O) devices, such as a keyboard, a mouse, touchscreen and/or a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 illustrates an example of a variety of information handling systems (IHSs) with a variety of connections. As shown in FIG. 1, IHS 110 may be a mobile IHS, for example, a tablet, smart phone, laptop, or some other IHS. When an application computation is requested, IHS 110 may perform an analysis to determine where to allocate the application computation to be performed, for example, whether the application computation should be offloaded to IHS 120 or 130 or should be performed locally at IHS 110.

IHS 110 may include a processor 112 communicatively coupled to a memory 114, a connection device 116, and a battery 118. IHS 120 may include a processor 122 communicatively coupled to a memory 124 and a connection device 126. IHS 130 may include a processor 132 communicatively coupled to a memory 134 and a connection device 136. IHSs 110, 120, and 130 may be in communication with each other via network 140.

A processor, for example, processors 112, 122, and 132 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, a processor may interpret and/or execute program instructions and/or process data stored in a memory and/or another component of an information handling system. Although FIG. 1 depicts information handling systems 110, 120, and 130 as including one processor, information handling systems 110, 120, and 130 may include any suitable number of processors.

Memories 114, 124, and 134 may be communicatively coupled to processors 112, 122, and 132 respectively, and may include any system, device, or apparatus configured to retain program instructions and/or data for a period of time (e.g., computer-readable media). Memory may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to an information handling system is turned off. Although FIG. 1 depicts IHSs 110, 120, and 130 as including one memory 114, 124, and 134 respectively, IHSs 110, 120, and 130 may include any suitable number and variety of memories.

Connection devices 116, 126, and 136 may include any system, device, or apparatus configured to facilitate communication to or from an IHS. A connection device may include a modem, a network interface card (NIC), a wireless receiver and/or transmitter, an antenna, or other related devices to facilitate communication, or any combinations thereof. Although FIG. 1 depicts IHSs 110, 120, and 130 as including one connection device 116, 126, and 136 respectively, IHSs 110, 120, and 130 may include any suitable number and variety of connection devices. For example, IHS 110 may include a connection device configured to allow communication with a cellular network and a connection device configured to allow communication with a Wi-Fi or other wireless network. In some embodiments, this may be accomplished by a single connection device with multiple functionalities.

Battery 118 may include any system, device, or apparatus configured to store electrochemical, electromechanical, or other forms of energy and may provide electrical energy to one or more components of IHS 110. In some embodiments, battery 118 may be a rechargeable battery, meaning that its electrochemical energy may be restored by the application of electrical energy (e.g., a lead and sulfuric acid battery, nickel cadmium (NiCad) battery, nickel metal hydride (NiMH) battery, lithium ion (Li-ion) battery, lithium ion polymer (Li-ion polymer) battery, smart battery, or any combination thereof, or any other suitable battery). While IHS 110 is shown as only having a single battery, it will be appreciated that any number and combination of batteries may be used. Additionally, while IHSs 120 and 130 are not shown having a battery, they may include one or more batteries. Further, while IHS 110 is shown having battery 118, IHS 110 may additionally include an additional or alternative power source, for example, solar cells, an electric plug (for example to allow IHS 110 to be plugged into an electrical outlet), or any other source of power to allow IHS 110 to operate, or any combination thereof.

Battery 118 may have an associated battery state. This may indicate whether the battery is operational or defective, a degree of charge of the battery, a time until complete discharge of the battery, whether the battery is currently charging or not, whether the degree of charge is below a predetermined or critical threshold, or any combination thereof. For example, a current battery state of battery 118 may indicate that battery 118 is currently being used to power IHS 110, that it is 57% charged, and that it will be completely discharged in six hours. An alternative battery state may indicate that IHS 110 is plugged into an electrical outlet so battery 118 is currently charging, that it is 58% charged, and that it will take four hours to fully charge battery 118. As another example, the battery state may only indicate that battery 118 is below an ideal level.

Network 140 may include any network and/or fabric configured to allow communication between IHSs 110, 120, and 130. Network 140 may be implemented as, or may be a part of, a storage area network (SAN), personal area network (PAN), local area network (LAN), a metropolitan area network (MAN), a wide area network (WAN), a wireless local area network (WLAN), a virtual private network (VPN), a cellular network, an intranet, the Internet, or any other appropriate architecture or system that facilitates the communication of signals, data and/or messages (generally referred to as data), or any combinations thereof. Network 140 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 140 and its various components may be implemented using hardware, software, or any combination thereof.

In some embodiments, network 140 may include a home network region 142, an office network region 146, and a cellular network region 144. For example, IHS 110 and IHS 120 may be connected to a Wi-Fi router 143 providing access to home network region 142 of network 140. As an alternative example, IHS 110 may be connected to cellular network region 144 of network 140 via one of service provider 145a or 145b. Service providers 145a and 145b may provide different speeds of access to the same or a similar cellular network, or may provide access to different cellular networks, or may provide access to cellular network region 144 at a variety of locations, or any combinations thereof. IHS 130 may be connected to network 140 via access point 147 in office network region 146. In some embodiments, office network 146 may be a secured network. While only a small number of routers, access points, and service providers may be shown, it will be appreciated that any number and/or variety of infrastructure may be utilized in the implementation of network 140. Additionally, it will be appreciated that any number and/or variety of regions may be included in network 140.

One non-limiting example of how the IHSs may be connected may be that IHS 110 may be in communication with IHS 120 via a home-based Wi-Fi network. IHS 110 may be in communication with IHS 130 via a cellular network using 4G Long Term Evolution (LTE). IHS 120 may be in communication with IHS 130 via a VPN.

In some embodiments, network 140 may include physical connections or close proximity wireless connections. For example, IHS 110 may be connected to IHS 120 via a universal serial bus (USB) cable or a BLUETOOTH® connection.

IHS 110 may employ remote computing, but need not do so. For example, some portion of the computing requested at IHS 110 may be offloaded to a remote IHS like IHS 120 and/or 130. Each of IHSs 110, 120, and 130 may have an associated computing capability indicating the capacity and/or capability of that information handling system to perform computing tasks. This may be based on a variety of factors, for example, the number and speed of processors, the number of applications and/or operating systems running, the amount and type of memory available on the IHS, software compatibilities, software plug-ins, video capabilities, display capabilities, power level, or any combination thereof.

Computing tasks or application computing may include any calculating, executing, processing, generating, modifying, coding, decoding, compressing, decompressing, displaying, translating, or combinations thereof utilized in conjunction with the use of an application, operating system, or other information handling system program.

In some embodiments, IHS 110 may create and maintain a database of each IHS's computing capability in memory 114. The database may be updated on a periodic basis or on the occurrence of a pre-determined event (for example, when a decision must be made as to what IHS should perform application computing, or when IHS 110 is powered on).

In some embodiments, an application may be completely executed on a remote IHS (for example IHS 120 or 130) and resulting data or a display transmitted to a mobile IHS (for example IHS 110) and commands from the mobile IHS transmitted to the remote IHS for execution. In other embodiments, an application may be completely executed on the mobile IHS, with limited or no interaction with the remote IHS. In still other embodiments, the application computing may be divided between multiple IHSs. For example, when using a video-heavy application, the application may be processed at a remote IHS and an uncompressed video stream may be sent to the mobile IHS. Alternatively, the application may be processed and the video stream compressed and sent to the mobile IHS, and the video stream may be decompressed at the mobile IHS. Additionally, there may be varying levels of compression that may occur with a trade-off between size in video stream to be transmitted and loss in quality and/or processing required to decompress the video stream. Wherever the application computing is performed, there may be a computing cost associated with performing the application computing. This may include the power used by the IHS to perform the application computing, as well as the resource cost to perform the computing (for example, the processor cycle and/or memory blocks used to perform the application computing).

In addition to the actual application computing, data may have to be located and utilized in conjunction with the application computing. For example, if the application computing is to be performed at a mobile IHS but the data to be used in the computing is stored at a remote IHS, the data must be transmitted to the mobile IHS before it can perform the application computing. In like manner, if the application computing is to be performed at the remote IHS but the data to be used in the computing is stored at the mobile IHS, the data must be transmitted to the remote IHS before the application computing may be performed. This may be referred to as a communication cost, and may include the power required to power a communication device to communicate data, as well as the communication resources to communicate the data (for example, the Wi-Fi bandwidth or cellular data that is transmitted or received). As described above, communication costs may also include the transmission and/or reception of data produced by the application computing. Using the example from above, a video stream may be created at the remote IHS which must be transmitted to the mobile IHS.

When a user operates IHS 110, that user may have a user context in which IHS 110 is being operated. This may include a variety of factors, including, but not limited to, the user's user style (for example, a power user, a knowledge worker, a professional nomad, a task worker, an institutional collaborator, a temporary user, or others), the user's habits and patterns of use, the connection IHS 110 has with network 140, the connection IHS has with each of IHSs 120 and 130, the application being used, the physical location of IHS 110, or combinations thereof.

A user style may be based on a generic or default set of typical requirements or usage for a particular category of user. For example, a power user may require a large amount of resources because of the heavy resource-utilizing application computing performed and the number and complexity of applications employed. As an alternative example, a task worker may require a lower amount of resources because the number and complexity of applications is low. As a further example, a professional nomad may require a medium level of resources, but may require a high level of connectivity and bandwidth because of the frequent travel the user may experience. The user style may be designated by the user themselves or may be designated by some other party, for example, a system administrator. Any number and variation of user styles may be used. In some embodiments, a user style may also correspond to a default application profile that may be transmitted to IHS 110 to be stored in memory 114 or some other storage device and updated and refined as a local application profile. IHS 110 may also store the user style.

A user's habits and patterns of use may be stored or recorded as a local application profile. This may allow predictions to be made as to the style and frequency of a user's use of an IHS. For example, a particular user may check their email on their smart phone after waking up, not use their smart phone for an hour while they get ready, and then may use their smart phone continuously for an hour while they ride a train to work. The user may then stream videos during their lunch hour, and not use their smart phone again until the ride home. Saturday afternoons, the user may go for a run in a particular park and stream music from their smart phone while running Over time, patterns of use will emerge regarding the type of use (for example, business or personal), the type of application being used (for example, a web browser, a word processing program, or a software coding program), the location of use (for example, their home, their office, the train, the park), and combinations thereof. This information may be stored locally on a user's IHS as a local application profile.

The connection between IHS 110 and network 140 may be a component of the user's context. For example, and in no way limiting, at a single location, a smart phone may be connected via a home Wi-Fi network, via a 4G LTE cellular connection, or via a 3G cellular connection. The connection may have an associated speed or bandwidth and latency for both upload and download. The connection may also have an associated bit rate, error rate, or any other of a variety of factors that may contribute to the quality of service of a connection. The location of IHS 110 may also be determined in some embodiments based on the type of connection. For example, if IHS 110 is connected to a home Wi-Fi network, the location of IHS 110 is the same as the home Wi-Fi network. As an alternative example, if IHS 110 is connected to a cellular 4G LTE network, the nearest cellular tower may provide an approximate location of IHS 110. In some embodiments, a global positioning system (GPS), triangulation, or some other means or method may be used to determine the location of IHS 110.

The connection between IHS 110 and each of IHSs 120 and 130 may be a component of the user's context. As non-limiting examples of connections between the IHSs, IHS 110 may be connected to IHS 130 through a VPN, or a secure connection, or IHS 110 may be connected to IHS 120 through an unsecured Wi-Fi network. Alternatively, IHS 110 may be connected to IHS 120 via a BLUETOOTH® connection or a USB cable.

The application being used may be part of the user's context. For example, a user may seek to utilize a web browser, a word processing program, a database program, a spreadsheet program, a computer-assisted design (CAD) program, or any other of a variety of applications. Each application may have an associated set of application requirements. This may indicate any of a minimum or suggested operating system, processor, graphic processor, memory, disk space, software or software components, or any combination thereof. In some embodiments, not all applications to be utilized may run natively on IHS 110.

Figure 2:
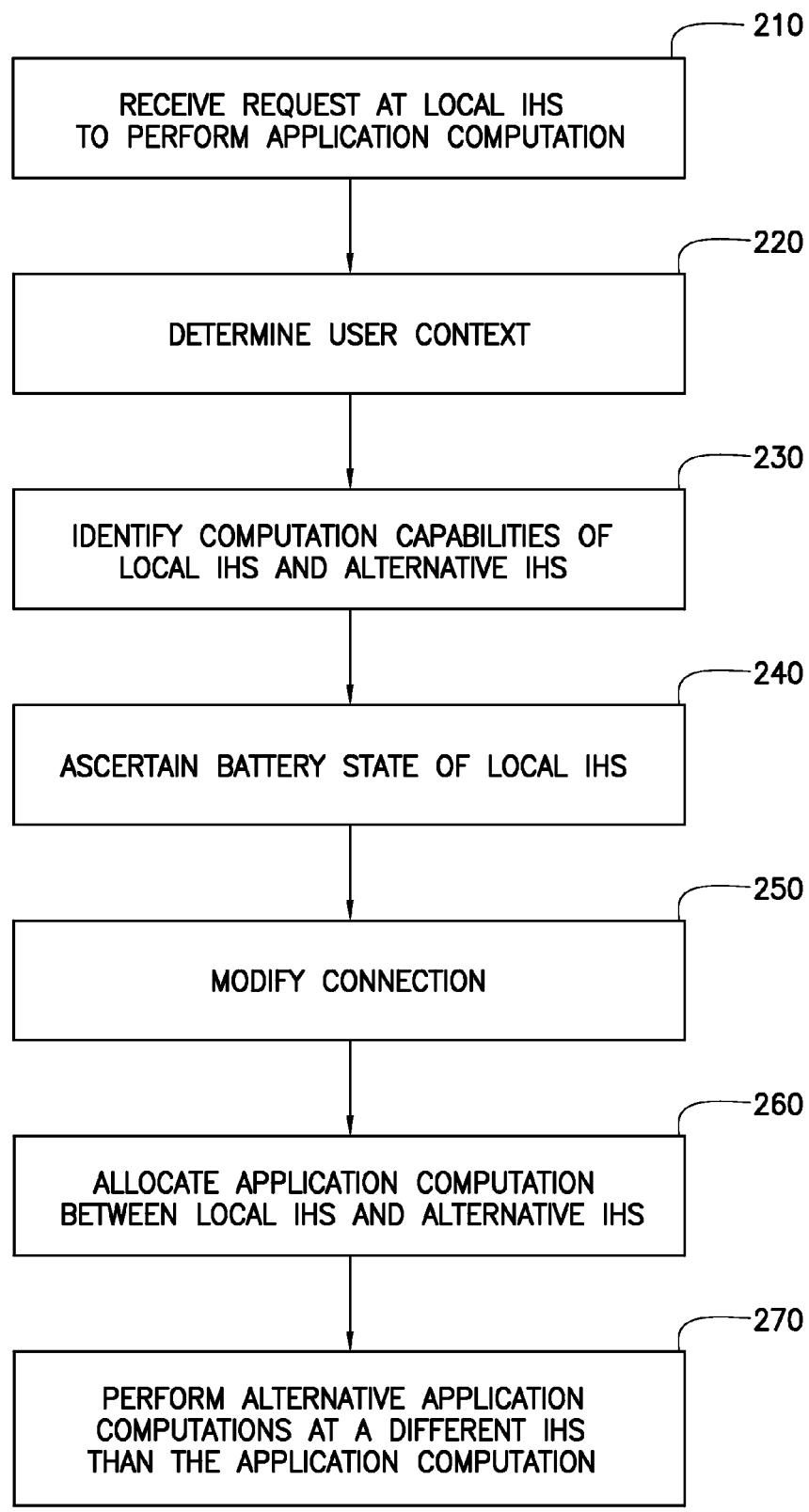
FIG. 2 illustrates an example set of operations in accordance with the present disclosure.

FIG. 2 illustrates an example set of operations to be performed. At operation 210 an information handling system may receive a request at a local IHS to perform an application computation. This may include launching an application that was not previously running on the local IHS, performing a particular task in a running application, or any other application computation. At operation 220, the user's context is determined. As described above, the user's context may be based on a variety of factors, any combination of which may be included at operation 220.

At operation 230, the available computation capabilities may be determined. The local IHS may recall its own computation capabilities and receive the computation capabilities of the alternative IHS. This may be performed each time an application computation is requested, or this may be periodically updated. The local IHS may maintain a database reflecting this information.

At operation 240, the battery state of the local IHS may be ascertained. As described above, this may include a variety of factors. At operation 250, the connection between the IHS and a network may be modified. For example, if a user is currently not connected to a network or is connected through a slow connection, the connection may be created or modified to utilize an alternative connection. This may be done to optimize the application computation. An example description of modifying the connection may be described in application Ser. No. 13/604,906, incorporated herein by reference in its entirety.

At operation 250, the application computation is allocated between the IHS and an alternative IHS. The allocation at operation 250 may be based on a variety of factors and considerations, including but not limited to, the user context (for example, any of user style, the user's habits and patterns, the connection of the IHS with a network, the connection of the IHS with the alternative IHS, the application being used, and the location of the IHS), the battery state, a security policy, and the location of data to be used in the application computation. Some factors favor locally performing the application computation. For example and in no way limiting, a high energy state (for example, when the IHS is connected to an electrical socket or has a high battery charge), the application being available on the IHS, a low connectivity speed, a high cost of connectivity, and data required for the application computation being available at the IHS may all favor allocating the application computation to the IHS. As an alternative example, a low cost of connectivity, a low power communication means, a high resource computation, the application not being available on the IHS, and data required for the application computation only being available at the alternative IHS may all favor allocating the application computation to the alternative IHS. This may allow an IHS to adaptively determine where an application computation will be allocated.

In some embodiments, the allocation may be based on optimizing battery life for the local IHS. For example, if a communication cost in battery power will exceed the computation cost in battery power, the application computation may be allocated to the local IHS. Alternatively, if the communication cost is less than the computation cost in battery power, the application computation may be allocated to the remote IHS. In some embodiments, the battery life may be optimized subject to certain qualifications. For example, certain multi-media processing may be allocated to the local IHS for a particular application, but the remainder of application computations may be allocated to the remote IHS.

In some embodiments, a security policy may be location-based relative to the IHS and/or the data. Such a policy may prevent the transmission of data to or from an IHS based on certain aspects of the user context, for example, the location of the user. As a non-limiting example, there may be a security policy in place that secure data will not be sent to Iran for an application computation. If the user operating the local IHS is physically located in Iran and data needed for the application computation is located in the United States near the alternative IHS, the security policy may dictate that the application computation be performed at the alternative IHS rather than at the local IHS. This may be the case even if other factors may favor allocating the local IHS to perform the application computation such that all else being equal, if the same application computation were requested while the user was in the United States, it would be performed locally.

At operation 260, alternative application computations may be performed at a different IHS than where the application computation has been allocated. For example, if the application computation has been allocated to the alternative IHS, some related or associated alternative application computations may be performed at the local IHS. In some embodiments, the local IHS may perform multi-media processing, ADOBE FLASH® processing, OPEN GL® execution, DIRECTX® execution, web browsing processing (for example, hyper text markup language (HTML) processing), JAVA® processing, voice over internet protocol (IP) (VOIP) processing, video over IP processing, other associated tasks, or any combinations thereof. This may facilitate an increased user experience for some situations. For example, a user's web browsing experience may be enhanced by allowing local processing of ADOBE FLASH® elements, or a user's video conference may provide higher quality video and audio experience when executed locally.

While operations 210-270 are shown in a linear fashion, it will be appreciated that these steps may be done in a different order, done simultaneously, or some steps completely omitted. For example, 230, 250, or 270 may all be omitted. Alternatively, operations 220, 230, 240, and 250 may be done in any order. As another example, operation 230 may be performed before operation 210.

Figure 3:
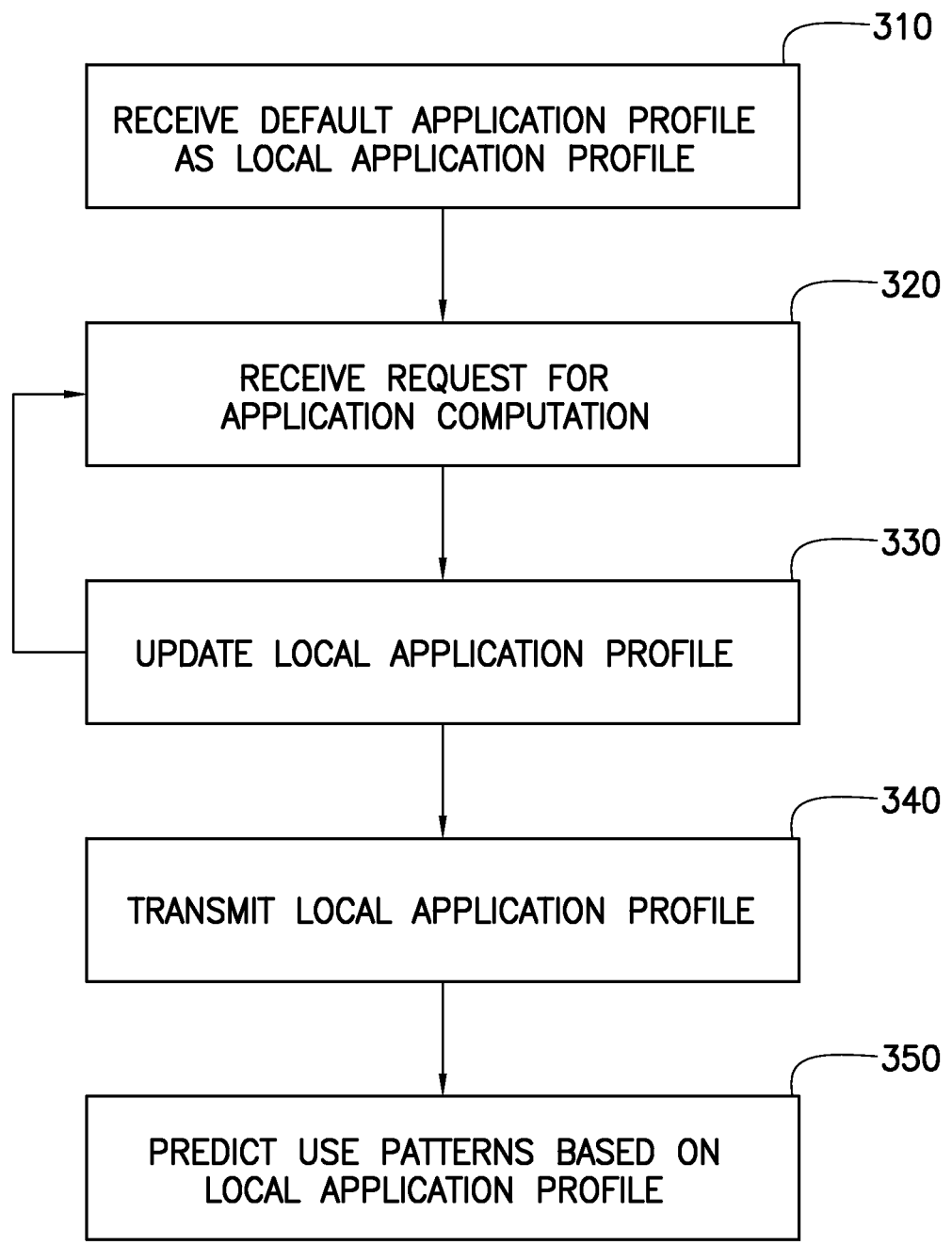
FIG. 3 illustrates an alternative example set of operations in accordance with the present disclosure.

FIG. 3 illustrates an alternative example set of operations in accordance with the present disclosure. At operation 310, a default application profile may be received at a local IHS as a local application profile. For example, the local IHS may receive a default application profile from an alternative IHS, the default application profile based on a user style of the user operating the IHS.

At operation 320, a request may be received for an application computation. At operation 330, the local application profile may be updated to reflect the request for an application computation at operation 320. The local application profile, when updated, may reflect what the application computation requested, what application (if any) was involved, the date and time of the request, the computing capability change, the location of the IHS when the request occurred, or any other information beneficial in predicting the use patterns of the user. This information may be stored in a memory of the local IHS, or some other storage device. In addition to being performed after operation 320, operation 330 may be performed at other times to update the local application profile. For example, operation 330 may be periodically performed to update what applications are running at certain times throughout a day or week. In some embodiments, rather than proceeding to operation 340, the process may repeatedly cycle through operations 320 and 330, and will only occasionally proceed on to operations 340 and/or 350.

At operation 340, the local application profile may be transmitted from the local IHS. For example, the local application profile may be transmitted to the alternative IHS such that the alternative IHS may modify and refine the default application profile. In some embodiments, this information may be transmitted anonymously. This may only be done periodically, for example, once per month or once every three months. In some embodiments, this may be an optional feature that a user may opt into. For example, upon initialization, a user may be asked if they are willing to periodically transmit their local application profile to refine the default application profile.

At operation 350, patterns of use of the user may be predicted based on the local application profile. For example, algebraic equations including a variable for a future event (for example, a request for an application computation) may be arranged based on the previous use reflected in the local application profile. The future event variable may then be solved for.

While operations 310-350 are shown in a linear fashion, it will be appreciated that these steps may be done in a different order, done simultaneously, or some steps completely omitted. For example, any of operations 310 and 340 may be omitted. Alternatively, operations 320, 330, 340, and 350 may be done in any order. As another example, operation 350 may be performed before or simultaneously with operation 340. As another example, operation 350 may be performed after operation 330, and then the process may proceed to return to operation 320.

In no way limiting, and merely by way of illustration, two examples are provided of how an application computation may be allocated. In one example, a user may want to run AutoCAD® from home from a work laptop. The user's AutoCAD® files may be stored at a cloud-based system at work. When the user launches AutoCAD®, the cloud-based AutoCAD® instance may be launched as it is next to their data and the communication costs of remotely running the application computation may be less than the computation cost coupled with the communication cost of retrieving the data. When the user is back in the office, when they launch AutoCAD® it may launch directly from their laptop as the laptop may now be plugged in and have a high bandwidth connection to access their AutoCAD® data. In a second example, before a user leaves for a flight, they may launch an email application from a tablet. The tablet may determine from the user's calendar that the user will be in flight shortly and so may need a mobile email application that allows an offline mode for email. Rather than launching a cloud-based instance of Outlook®, the tablet may instead launch the mobile email application. When the user connects at night from their hotel, the tablet may launch the cloud-based instance of Outlook®.

While a variety of examples have been provided and described, it will be appreciated that none of the examples is intended to be limiting. Rather, the examples are provided merely for illustrative purposes to provide assistance in understanding the present disclosure.

Although the present disclosure has been described in detail, it should be understood that various changes, substitutions, and alterations can be made hereto without departing from the spirit and the scope of the disclosure as defined by the appended claims.

What is claimed is:

1. A method comprising:
   receiving a request at a first information handling system (IHS) to perform an application computation;
   determining a user's context, the user operating the first IHS and requesting performance of the application computation, the user's context including a default user style of the user, selected from a predetermined set of styles;
   determining a first computational capability of the first IHS, the first computational capability based on at least one of a number of processors of the first IHS, a speed of a processor of the first IHS, a number of applications running on the first IHS, a number of operating systems running on the first IHS, an amount of memory available on the first IHS, and a type of memory available on the first IHS;
   determining a second computational capability of a second IHS, the second computational capability based on at least one of a number of processors of the second IHS, a speed of a processor of the second IHS, a number of applications running on the second IHS, a number of operating systems running on the second IHS, an amount of memory available on the second IHS, and a type of memory available on the second IHS; and
   allocating the application computation between the first IHS and the second IHS, wherein a first portion of the application is allocated to the first IHS and a second portion of the application is allocated to the second IHS based at least on the user's context, at least one of the first computational capability and the second computational capability, and at least one of a location of data to be used in the application computation, a location of the first IHS, a time of use of the first IHS, and a security policy.

2. The method of claim 1, wherein determining the user's context comprises:
storing patterns of use of the first IHS by the user; and
predicting patterns of use of the first IHS by the user based at least on the stored patterns of use and the default user style of the user.

3. The method of claim 1, wherein determining the user's context comprises:
determining at least one of speed, bandwidth, latency, or error rate of a connection between the first IHS and the second IHS; and
determining a communication cost of communicating via the connection.

4. The method of claim 3, further comprising modifying the connection to optimize the application computation.

5. The method of claim 1, wherein alternative application computations are performed at a different IHS than the application computation.

6. The method of claim 1, wherein allocating the application computation is further based on a computation cost of the application computation, the computation cost including at least one of a power cost to perform the application computation, a resource cost to perform the application computation, and a communication cost to transmit data used in the application computation.

7. A non-transitory computer-readable medium containing instructions that, when executed by a processor, are configured to:
receive a request at a first information handling system (IHS) to perform an application computation;
determine a user's context, the user operating the first IHS and requesting performance of the application computation, the user's context including a default user style of the user, selected from a predetermined set of styles;
determine a first computational capability of the first IHS, the first computational capability based on at least one of a number of processors of the first IHS, a speed of a processor of the first IHS, a number of applications running on the first IHS, a number of operating systems running on the first IHS, an amount of memory available on the first IHS, and a type of memory available on the first IHS;
determine a second computational capability of a second IHS, the second computational capability based on at least one of a number of processors of the second IHS, a speed of a processor of the second IHS, a number of applications running on the second IHS, a number of operating systems running on the second IHS, an amount of memory available on the second IHS, and a type of memory available on the second IHS; and
allocate the application computation between the first IHS and the second IHS, wherein a first portion of the application is allocated to the first IHS and a second portion of the application is allocated to the second IHS based at least on the user's context, at least one of the first computational capability and the second computational capability, and at least one of a location of data to be used in the application computation, a location of the first IHS, a time of use of the first IHS, and a security policy.

8. The computer-readable medium of claim 7, wherein determining the user's context comprises:
storing patterns of use of the first IHS by the user; and
predicting patterns of use of the first IHS by the user based at least on the stored patterns of use and the default user style of the user.

9. The computer-readable medium of claim 7, wherein determining the user's context comprises:
determining at least one of speed, bandwidth, latency, or error rate of a connection between the first IHS and the second IHS; and
determining a communication cost of communicating via the connection.

10. The computer-readable medium of claim 9, the instructions further configured to modify the connection to optimize the application computation.

11. The computer-readable medium of claim 7, wherein alternative application computations are performed at a different IHS than the application computation.

12. The computer-readable medium of claim 10, wherein allocating the application computation is further based on a computation cost of the application computation, the computation cost including at least one of a power cost to perform the application computation, a resource cost to perform the application computation, and a communication cost to transmit data used in the application computation.

13. A system comprising:
a processor;
a memory communicatively coupled to the processor; and
instructions stored within the memory, the instructions, when executed by the processor, causing the processor to:
receive a request to perform an application computation;
determine a user's context of operation of a first information handling system (IHS), the user requesting performance of the application computation, the user's context including a default user style of a user, selected from a predetermined set of styles;
determine a first computational capability of the first IHS, the first computational capability based on at least one of a number of processors of the first IHS, a speed of a processor of the first IHS, a number of applications running on the first IHS, a number of operating systems running on the first IHS, an amount of memory available on the first IHS, and a type of memory available on the first IHS;
determine a second computational capability of a second IHS, the second computational capability based on at least one of a number of processors of the second IHS, a speed of a processor of the second IHS, a number of applications running on the second IHS, a number of operating systems running on the second IHS, an amount of memory available on the second IHS, and a type of memory available on the second IHS; and
allocate the application computation between the first IHS and the second IHS, wherein a first portion of the application is allocated to the first IHS and a second portion of the application is allocated to the second IHS based at least on the user's context, at least one of the first computational capability and the second computational capability, and at least one of a location of data to be used in the application computation, a location of the first IHS, a time of use of the first IHS, and a security policy.

14. The system of claim 13, wherein determining the user's context comprises:
storing patterns of use of the first IHS by the user; and
predicting patterns of use of the first IHS by the user based at least on the stored patterns of use and the default user style of the user.

15. The system of claim 13, wherein determining the user's context comprises:
determining at least one of speed, bandwidth, latency, or error rate of a connection between the first IHS and the second IHS; and
determining a communication cost of communicating via the connection.

16. The system of claim 13, wherein alternative application computations are performed at a different IHS than the application computation.

17. The system of claim 13, wherein allocating the application computation is further based on a computation cost of the application computation, the computation cost including at least one of a power cost to perform the application computation, a resource cost to perform the application computation, and a communication cost to transmit data used in the application computation.

* * * * *